United States Patent [19]
Jones

[11] Patent Number: 6,112,980
[45] Date of Patent: Sep. 5, 2000

[54] DISCIPLINE STICK

[76] Inventor: Melody A. Jones, 23765 Laura La., New Caney, Tex. 77357

[21] Appl. No.: 09/174,357

[22] Filed: Oct. 15, 1998

[51] Int. Cl.⁷ .............................. B68B 11/00; A63B 15/00

[52] U.S. Cl. ............................................ 231/2.1; 463/47.2

[58] Field of Search ........................ 231/2.1, 4; 463/47.2, 463/47.5; 54/78

[56] References Cited

U.S. PATENT DOCUMENTS

| | | | |
|---|---|---|---|
| 452,327 | 5/1891 | Whipple | 231/2.1 |
| 815,199 | 3/1906 | Monetti | 231/2.1 |
| 2,839,242 | 6/1958 | Meistrell | 231/2.1 |
| 3,648,925 | 3/1972 | Fryer | 231/2.1 |

*Primary Examiner*—Robert P. Swiatek

[57] ABSTRACT

A disciplining apparatus including a handle and a plurality of elongated strips mounted on an end of the handle. The strips extend from the handle in a common direction. The strips are further configured in a shape of a cylinder.

9 Claims, 2 Drawing Sheets

DISCIPLINE STICK

BACKGROUND OF THE INVENTION

1. Field of the Invention

The present invention relates to whips and more particularly pertains to a new discipline stick for disciplining a child or pet.

2. Description of the Prior Art

The use of whips is known in the prior art. More specifically, whips heretofore devised and utilized are known to consist basically of familiar, expected and obvious structural configurations, notwithstanding the myriad of designs encompassed by the crowded prior art which have been developed for the fulfillment of countless objectives and requirements.

Known prior art whips and the like include U.S. Pat. Nos. 4,154,391; 3,799,429; U.S. Pat. Des. No. 329,309; U.S. Pat. Nos. 3,157,000; 3,136,480; and 5,144,791.

In these respects, the discipline stick according to the present invention substantially departs from the conventional concepts and designs of the prior art, and in so doing provides an apparatus primarily developed for the purpose of disciplining a child or pet.

SUMMARY OF THE INVENTION

In view of the foregoing disadvantages inherent in the known types of whips now present in the prior art, the present invention provides a new discipline stick construction wherein the same can be utilized for disciplining a child or pet.

The general purpose of the present invention, which will be described subsequently in greater detail, is to provide a new discipline stick apparatus and method which his many of the advantages of the whips mentioned heretofore and many novel features that result in a new discipline stick which is not anticipated, rendered obvious, suggested, or even implied by any of the prior art whips, either alone or in any combination thereof.

To attain this, the present invention generally comprises a handle constructed with a sheet of resilient material selected from the group of materials including leather and rubber. Such sheet has a rectangular configuration with a pair of short edges and a pair of elongated edges. As shown in FIGS. 1 & 2, the elongated edges are equipped with a plurality of linearly aligned apertures formed therealong. In use, the elongated edges are maintained in adjacent parallel relationship via a lace interwoven within the apertures. As such, the sheet defines a tube with a pair of open ends formed by the short edges of the sheet. Next provided is a flexible, inelastic strap having a pair of ends mounted on a first one of the short edges of the sheet of the handle. The ends are preferably positioned at diametrically opposed points of the open end of the handle. Further, the ends of the strap are spaced ninety degrees with respect to the elongated edges of the sheet of the handle. Finally, a plurality of elongated strips are provided which are each constructed from a resilient material selected from the group of materials including bamboo and plastic. Each of the strips have a length greater than that of the handle and a constant rectangular cross-section along a length thereof. Inboard ends of the strips are coupled to a second one of the short edges of the sheet of the handle such that the strips define a cylinder of a diameter equal to that of the handle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new discipline stick apparatus and method which has many of the advantages of the whips mentioned heretofore and many novel features that result in a new discipline stick which is not anticipated, rendered obvious, suggested, or even implied by any of the prior art whips, either alone or in any combination thereof.

It is another object of the present invention to provide a new discipline stick which may be easily and efficiently manufactured and marketed.

It is a further object of the present invention to provide a new discipline stick which is of a durable and reliable construction.

An even further object of the present invention is to provide a new discipline stick which is susceptible of a low cost of manufacture with regard to both materials and labor, and which accordingly is then susceptible of low prices of sale to the consuming public, thereby making such discipline stick economically available to the buying public.

Still yet another object of the present invention is to provide a new discipline stick which provides in the apparatuses and methods of the prior art some of the advantages thereof, while simultaneously overcoming some of the disadvantages normally associated therewith.

Still another object of the present invention is to provide a new discipline stick for disciplining a child or pet.

Even still another object of the present invention is to provide a new discipline stick that includes a candle and a plurality of elongated strips mounted on an end of the handle. Such strips extending from the handle in a common direct. The strips are further configured in a shape of a cylinder.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
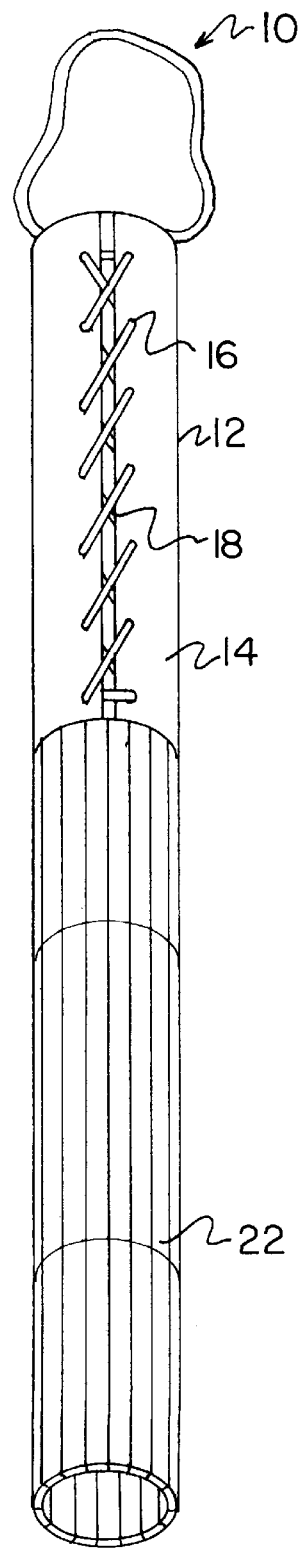
FIG. 1 is a top view of a new discipline stick according to the present invention.

With reference now to the drawings, and in particular to FIGS. 1 through 4 thereof, a new discipline stick embodying the principles and concepts of the present invention and generally designated by the reference numeral 10 will be described.

Figure 2:
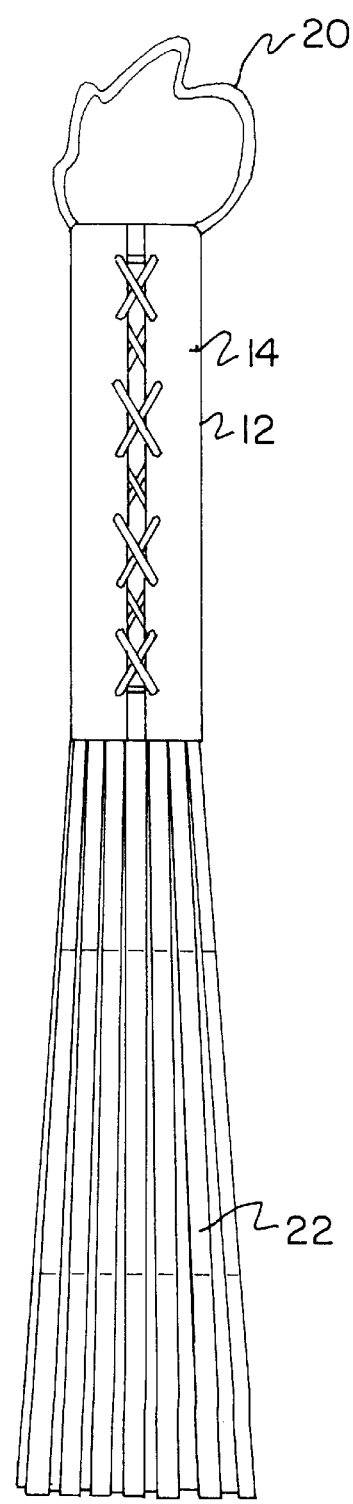
FIG. 2 is a top view of the present invention with the strips fanned as in the case where the strips are struck on an object or being.
Figure 3:
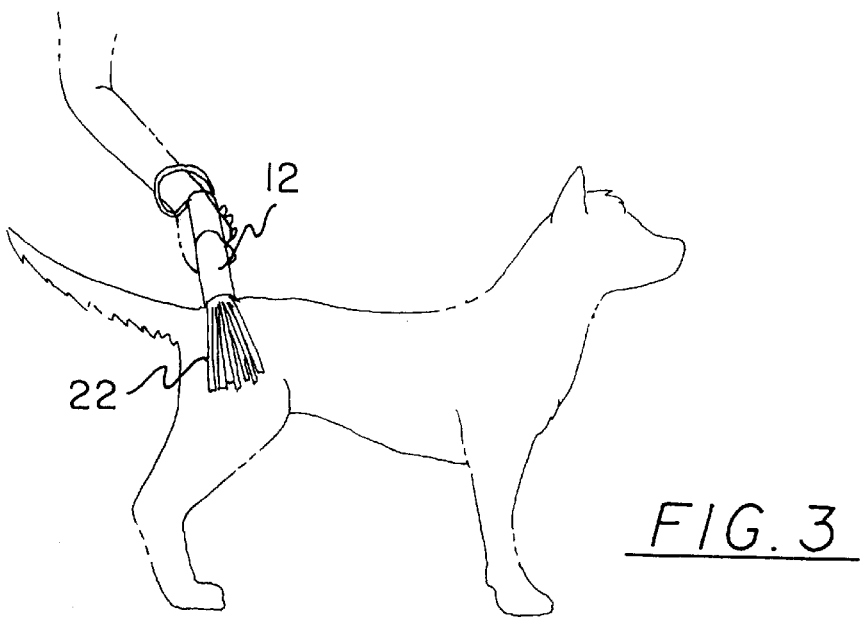
FIG. 3 is a perspective view of the present invention being used to discipline a pet such as a dog.
Figure 4:
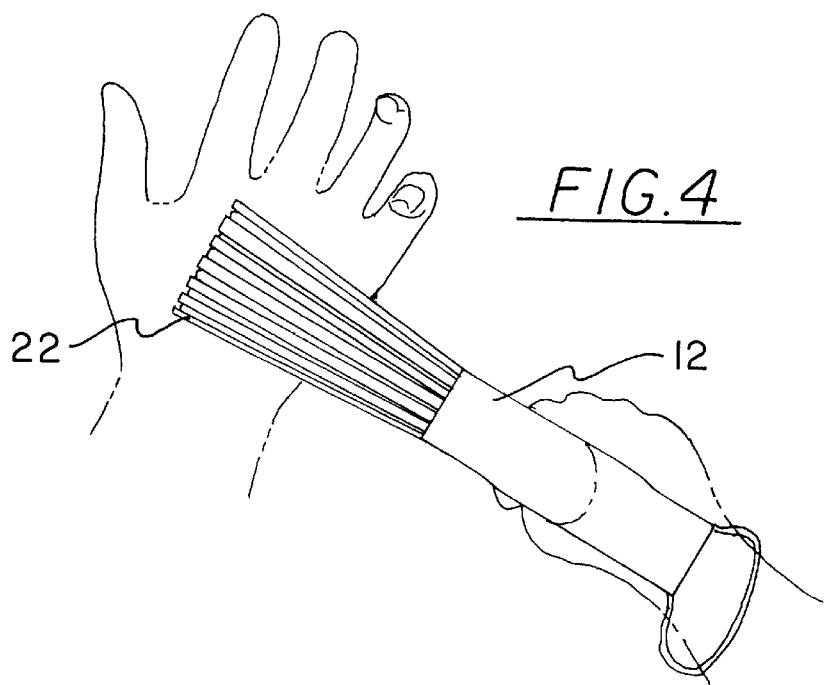
FIG. 4 is a perspective view of the present invention being used to discipline a person.

The present invention, designated as numeral 10, includes a handle 12 constructed with a sheet 14 of resilient material selected from the group of materials including leather and rubber. Such sheet has a rectangular configuration with a pair of short edges and a pair of elongated edges. As shown in FIGS. 1 & 2, the elongated edges are equipped with a plurality of linearly aligned apertures 16 formed therealong. In use, the elongated edges are maintained in adjacent parallel relationship via a lace 18 interwoven within the apertures. As shown in FIGS. 1 & 2 such lace is preferably woven in a cross-stitched fashion. As such, the sheet defines a tube with a pair of open ends formed by the short edges.

Next provided is a flexible, inelastic leather strap 20 having a pair of ends mounted on a first one of the short edges of the sheet of the handle. The ends are preferably positioned at diametrically opposed points of the open end defined by the first short edge of the sheet. Further, the ends of the strap are spaced ninety degrees with respect to the elongated edges of the sheet of the handle. A length of the strap is preferably sufficient to allow the strap to be worn about a wrist of a user.

Finally, a plurality of elongated linear strips 22 are provided which are each constructed from a resilient material selected from the group of materials including bamboo and plastic. Each of the strips has a length greater than that of the handle and a constant rectangular cross-section along a length thereof. A total length of the present invention preferably amounts to about 22 inches. Inboard ends of the strips are coupled to a second one of the short edges of the sheet of the handle such that the strips define a cylinder of a diameter equal to that of the handle. As an option, a pair of rubber bands may be mounted along the strips in concentric relationship in order to maintain the same in a cylindrical shape.

In use, the handle may be grasped and the strips struck against an object or being. When struck, the strips are adapted to fan out as shown in FIG. 2. Further, by the structure set forth heretofore, a loud sound is generated when the strips are waved in free space to afford a startling effect.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pet disciplining apparatus comprising, in combination:

a handle including a sheet of resilient material selected from the group of materials including leather and rubber, the sheet having a rectangular configuration with a pair of short edges and a pair of elongated edges with a plurality of linearly aligned apertures formed therealong wherein the elongated edges are maintained in adjacent parallel relationship via a lace interwoven within the apertures such that the sheet defines a tube with a pair of open ends formed by the short edges of the sheet;

a flexible, inelastic strap having a pair of ends mounted on a first one of the short edges of the sheet of the handle at diametrically opposed points of the open end thereby defined, wherein the ends of the strap are spaced ninety degrees with respect to the elongated edges of the sheet of the handle; and a plurality of elongated strips each constructed from a resilient material selected from the group of materials including bamboo and plastic, each of the strips having a length greater than that of the handle and a constant rectangular cross-section along a length thereof, wherein inboard ends of the strips are coupled to a second one of the short edges of the sheet of the handle such that the strips define a cylinder of a diameter equal to that of the handle.

2. A disciplining apparatus comprising:

a handle including a sheet of resilient material, the sheet having a rectangular configuration with a pair of short edges and a pair of elongated edges with a plurality of linearly aligned apertures formed therealong wherein the elongated edges are maintained in adjacent parallel relationship via a lace interwoven within the apertures such that the sheet defines a tube with a pair of open ends formed by the short edges of the sheet; and a plurality of elongated strips mounted on an end of the handle and extending therefrom in a common direction, wherein the strips define a cylinder.

3. A disciplining apparatus as set forth in claim 2 wherein the strips are each constructed from a resilient material selected from the group of materials including bamboo and plastic.

4. A disciplining apparatus as set forth in claim 2 wherein the strips are collapsible to form a planar fan configuration.

5. A disciplining apparatus as set forth in claim 2 wherein the handle is constructed from a resilient material selected from the group of materials including leather and rubber.

6. A disciplining apparatus as set forth in claim 2 wherein a strap is mounted on the handle for carrying purposes.

7. A pet disciplining apparatus comprising:

a handle including a sheet of resilient material, the sheet having a pair of relatively shorter edges and a pair of relatively longer edges with a plurality of apertures formed along the relatively longer edges, wherein the relatively longer edges are maintained in adjacent parallel relationship by a lace interwoven within the apertures such that the sheet defines a tube with a pair of open ends formed by the relatively shorter edges of the sheet;

a flexible strap having a pair of ends mounted on a first one of the relatively shorter edges of the sheet of the handle; and a plurality of elongated strips each constructed from a resilient material, each of the strips having a length greater than that of the handle, wherein inboard ends of the strips are coupled to a second one of the relatively shorter edges of the sheet of the handle such that the strips define a cylinder of a diameter equal to that of the handle.

8. A disciplining apparatus as set forth in claim 7 wherein the sheet is selected from the group of materials including leather and rubber.

9. A disciplining apparatus as set forth in claim 7 wherein the elongated strips are selected from the group of materials including bamboo and plastic.

* * * * *